United States Patent
Kanamori

(10) Patent No.: US 6,643,397 B1
(45) Date of Patent: Nov. 4, 2003

(54) IMAGE PROCESSING METHOD, IMAGE PROCESSING APPARATUS AND IMAGE FORMING APPARATUS

(75) Inventor: Keiko Kanamori, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 585 days.

(21) Appl. No.: 09/667,552

(22) Filed: Sep. 22, 2000

(30) Foreign Application Priority Data

Sep. 22, 1999 (JP) .......................................... 11-269262

(51) Int. Cl.[7] .................................................. G06K 9/00
(52) U.S. Cl. ........................ 382/162; 382/167; 382/168; 358/522
(58) Field of Search ................................ 382/162, 167, 382/168, 169, 274; 358/518, 522, 523, 530

(56) References Cited

U.S. PATENT DOCUMENTS

| | | | |
|---|---|---|---|
| 4,953,012 A | 8/1990 | Abe | 358/75 |
| 5,357,354 A | * 10/1994 | Matsunawa et al. | 358/518 |
| 5,471,325 A | 11/1995 | Abe | 358/524 |
| 5,726,781 A | * 3/1998 | Isemura et al. | 358/530 |
| 6,567,544 B1 | * 5/2003 | Kanno et al. | 382/169 |

FOREIGN PATENT DOCUMENTS

| | | |
|---|---|---|
| JP | 6-18440 | 3/1994 |
| JP | A 11-265967 | 9/1999 |

* cited by examiner

Primary Examiner—Phuoc Tran
(74) Attorney, Agent, or Firm—Foley & Lardner

(57) ABSTRACT

An image data processing apparatus includes a determining section for determining whether input image data supplied is a color image mode or monochrome image mode, a histogram forming section for forming a histogram corresponding to the input image data, a reference value calculating section for calculating a first reference value for density adjustment for the color image mode corresponding to the histogram, a reference value converting section for converting the first reference value into a second reference value for the monochrome image mode, and a density adjusting section for adjusting the density of the input image data by using the first reference value when the determining section determines that the input image data is the color image mode and using the second reference value when the determining section determines that the input image data is the monochrome image mode. With the above construction, when it is determined that the input image data is monochrome image data, the reference value can be converted, thereby making it unnecessary to scan the document again and take out a document image.

16 Claims, 7 Drawing Sheets

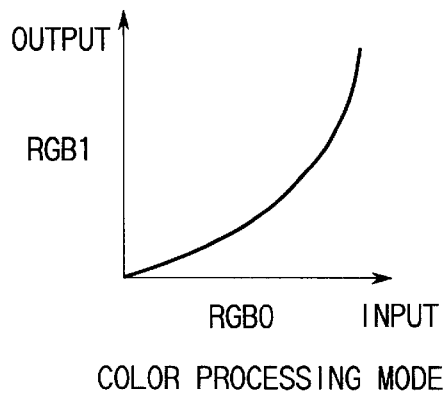
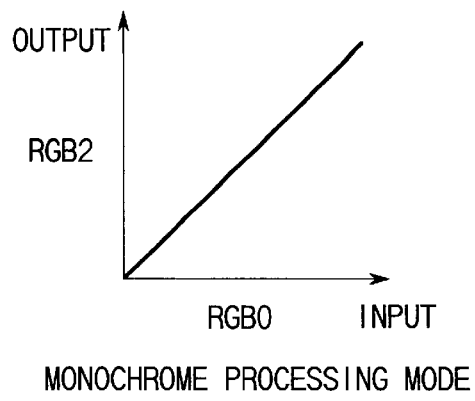
FIG. 4A COLOR PROCESSING MODE
FIG. 4B MONOCHROME PROCESSING MODE
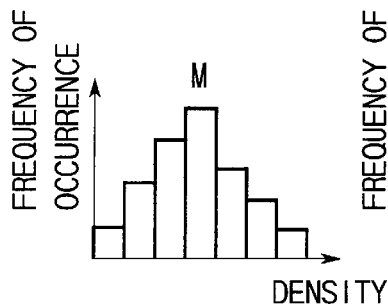
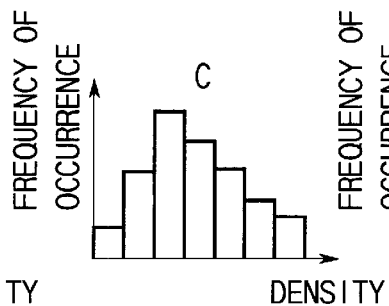
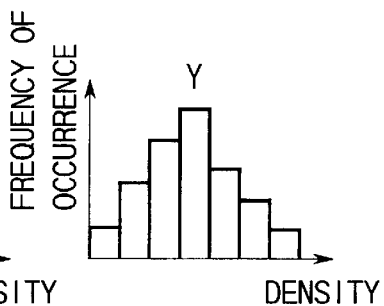
FIG. 5A  FIG. 5B  FIG. 5C
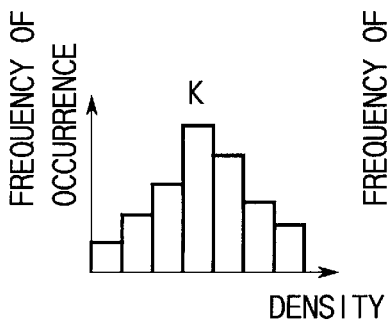
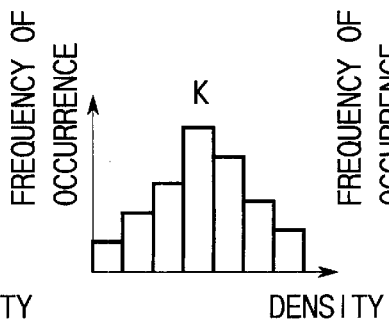
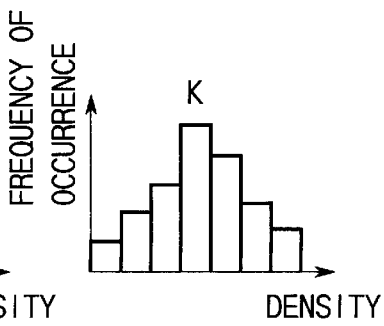
FIG. 6A  FIG. 6B  FIG. 6C

IMAGE PROCESSING METHOD, IMAGE PROCESSING APPARATUS AND IMAGE FORMING APPARATUS

CROSS-REFERENCE TO RELATED APPLICATIONS

This application is based upon and claims the benefit of priority from the prior Japanese Patent Application No. 11-269262, filed Sep. 22, 1999, the entire contents of which are incorporated herein by reference.

BACKGROUND OF THE INVENTION

This invention relates to an image processing method and image processing apparatus for processing input image data obtained by reading a document to obtain preset output data and an image forming apparatus such as a digital copying machine using the image processing apparatus.

Generally, in a image forming apparatus such as a digital copying machine for outputting an image obtained by reading a document by use of a scanner, a function for automatically changing the image processing methods for image data obtained by use of the scanner is provided so that a color image will be output if the read document is a color document and a monochrome image will be output if the read document is a monochrome document.

The process for determining whether the document is a color document or monochrome document is called ACS (Automatic Color Selection) determination. The ACS determination is generally made by effecting the color/monochrome identifying process for input image data containing a plurality of primary color component signals such as RGB signals for each pixel, counting the results of identification of color/monochrome and checking the ratios of the respective counts to the whole number of pixels in the document size area.

The ACS determination is normally effected by the pre-scanning operation prior to the original process which is to be effected in the image processing apparatus, and then the original process is effected by the main scanning operation after the internal processing mode is changed according to the result of determination.

In the image forming apparatus such as the digital copying machine, an automatic density adjusting function for automatically adjusting the density of an output image according to the type of a document to an optimum value is generally provided. For the automatic density adjustment, a histogram indicating the frequency of occurrence of respective density levels of the document image is formed and a reference value for density adjustment is calculated corresponding to the histogram. In order to reduce the processing time, it is desirable to simultaneously effect calculation of the reference value and formation of the histogram for the ACS determination and automatic density adjustment at the time of pre-scanning.

Histogram forming methods are generally different in the cases of a color document and a monochrome document. If it is previously known that the document is a color document or monochrome document and the color processing mode or monochrome processing mode is set according to the color document or monochrome document to be used, the automatic density adjusting operation can be properly effected by forming a histogram based on the set processing mode and deriving an adequate reference value.

However, if the automatic density adjusting operation is effected according to the result of the ACS determination while the processing mode is not set according to whether the document is a color document or monochrome document, an unsuitable histogram may be formed in some cases since a read document does not always correspond to the processing mode.

For example, in a case where image data obtained by reading a color document is input while the color processing mode is set, a histogram for the color image is adequately formed and a reference value for the automatic density adjustment derived based on the histogram becomes adequate. On the other hand, in a case where image data obtained by reading a monochrome document is input while the color processing mode is set, a histogram for a color image is formed and a reference value derived based on the histogram becomes inadequate for the automatic density adjustment for the monochrome document.

Therefore, in the conventional image forming apparatus such as the digital copying machine, if the set processing mode is different from the result of ACS determination, a histogram which corresponds to the result of ACS determination is formed by effecting the pre-scanning operation again and a reference value for the automatic density adjustment which corresponds to the read document is derived based on the histogram. Therefore, in this case, it is necessary to effect the pre-scanning operation twice, thereby increasing the processing time and, for example, in the digital copying machine, it takes a long time from the time the document is set and a copying button is depressed until the time an output image is obtained.

As described above, in the conventional image forming apparatus, an adequate reference value can be derived for the automatic density adjustment by use of the histogram formed when the set processing mode corresponds to the result of ACS determination, but in a case where the set processing mode does not correspond to the result of ACS determination, it is necessary to effect the pre-scanning operation again, form a histogram and derive a reference value for the automatic density adjustment based on the histogram, and as a result, the pre-scanning operation must be effected twice in total, thereby increasing the processing time.

BRIEF SUMMARY OF THE INVENTION

An object of this invention is to provide an image processing apparatus, image processing method, image forming apparatus and image forming method in which ACS determination can be made and, at the same time, a reference value for automatic density adjustment can be obtained by always effecting a pre-scanning operation only once while the processing time can be prevented from being increased by effecting a second pre-scanning operation even when a set processing mode does not correspond to the result of ACS determination.

The above object can be attained by an image data processing apparatus comprising determining means for determining whether input image data supplied is a color image mode or monochrome image mode; histogram forming means for forming a histogram indicating the frequency of occurrence of density levels for each of a plurality of color component signals based on the input image data; reference value calculating means for calculating a first reference value for density adjustment for the color image mode based on the histogram formed by the histogram forming means; reference value converting means for converting the first reference value for the color image mode into a second reference value for the monochrome image mode and outputting the second reference value; and density adjusting means for adjusting the density of the input image data by using the first reference value when the determining means determines that the input image data is the color image mode and using the second reference value output from the reference value converting means when the determining means determines that the input image data is the monochrome image mode and then outputting output image data.

As described above, the image processing apparatus according to this invention forms the histogram in parallel with the determination of the input image data and forms the (first) reference value based on the thus formed histogram. Then, if the input image data is the color image mode, the reference value is used as it is and if it is the monochrome image mode, the conversion process is effected to convert the (first) reference value into the (second) reference value for the monochrome image mode.

In the prior art, when it is determined that the reference value of a different image mode is obtained, the operation for fetching document image information by pre-scanning the document again if it is used as a digital copying machine, for example, and re-forming a reference value for the different image mode is effected so that the processing time will become long. However, in this invention, for example, a conversion table is formed, the reference value converting process is effected when it is determined that the reference value for the different image mode is obtained, and therefore, it becomes unnecessary to effect a process such as the second pre-scanning process for the document which takes a long period of time. As a result, a rapid and stable image density adjustment process can be effected and if it is used in an image forming apparatus, a rapid copying process can be attained without paying any attention to the color document image or monochrome document image.

In this invention, a method for forming a CMY-K conversion table used for the reference value conversion is explained in detail and it is possible to stably effect the process for converting the reference value between the color image mode and the monochrome image mode.

Further, in this invention, not only the above-described image processing apparatus but also the image forming apparatus, image processing method and image forming method are explained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are diagrams respectively showing input/output characteristics of a scanner signal converting section in the image processing apparatus according to the above embodiment at the time of color processing mode and at the time of monochrome processing mode;

FIGS. 5A to 5C are diagrams showing examples of a CMY histogram formed in a histogram forming section in the image processing apparatus according to the above embodiment;

FIGS. 6A to 6C are diagrams showing examples of a K histogram formed in the histogram forming section in the image processing apparatus according to the above embodiment;

DETAILED DESCRIPTION OF THE INVENTION

There will now be described an embodiment of this invention with reference to the accompanying drawings.

Construction of Digital Copying Machine

Figure 1:
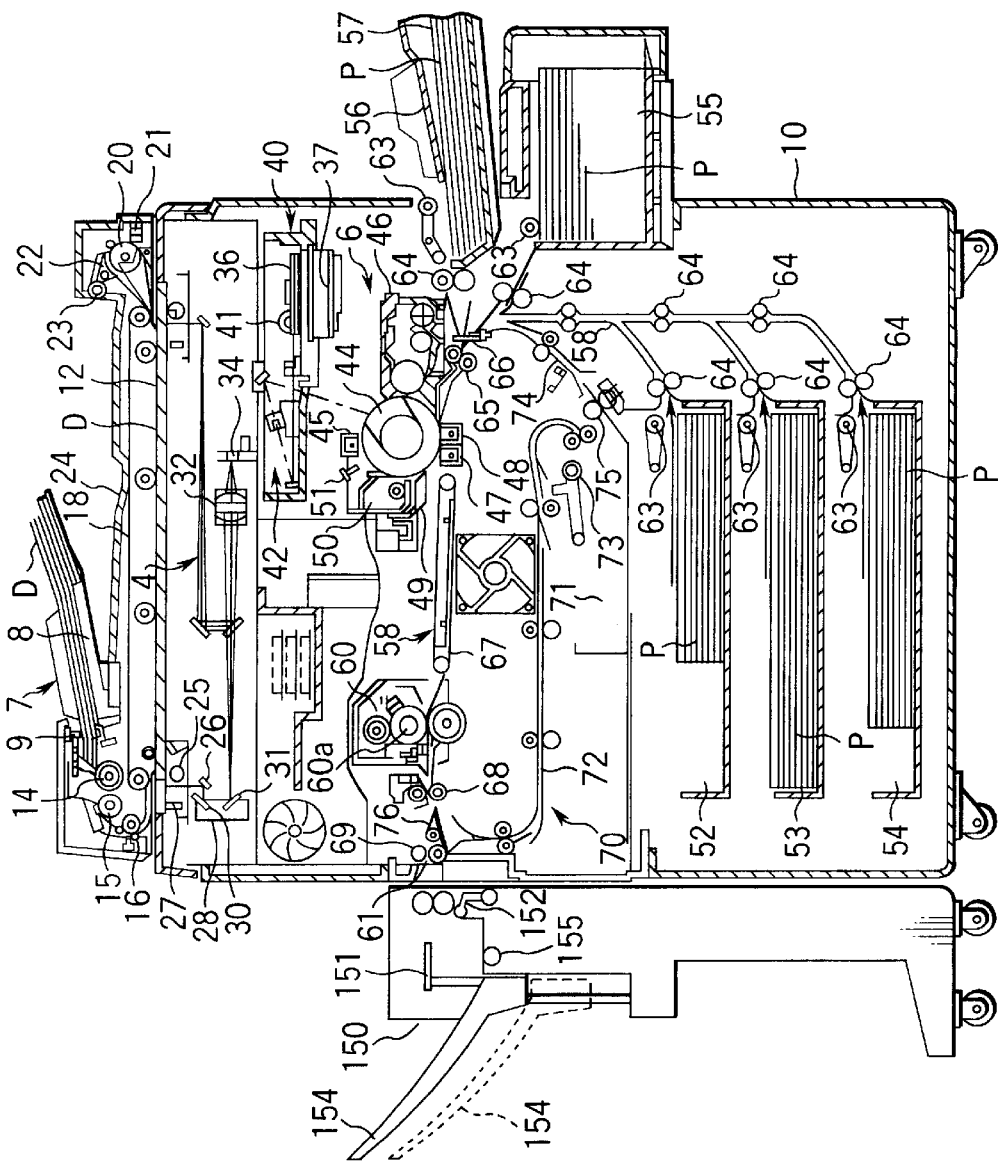
FIG. 1 is a cross sectional view showing the mechanical structure of a digital copying machine which is an image forming apparatus using an image processing apparatus according to one embodiment of this invention.

FIG. 1 shows the internal structure of a digital copying machine which is an image forming apparatus using an image processing apparatus according to one embodiment of this invention. The digital copying machine is a hybrid type copying machine having functions of a facsimile device and printer device in addition to a normal function of a copying machine, for example. In an apparatus main body 10, a scanner section 4 used as input means and a printer section 6 used as output means are provided.

On the upper surface of the apparatus main body 10, a document placing table 12 which is formed of a transparent glass plate and on which a document D as a to-be-read object is placed is disposed and an automatic document feeding device 7 for automatically feeding the document D onto the document placing table 12 is disposed. The automatic document feeding device 7 is disposed to be set into an open/closed state with respect to the upper surface of the document placing table 12 and also functions as a document holder for closely pressing the document D placed on the document placing table 12 against the document placing table 12.

The automatic document feeding device 7 includes a document tray 8 on which the document D is set, an empty sensor 9 for detecting the presence or absence of a document, a pickup roller 14 for taking out the document D for each sheet from the document tray 8, a paper feeding roller 15 for feeding the taken-out document D, an aligning roller pair 16 for aligning the front end of the document D, and a conveyor belt 18 disposed to cover substantially the entire portion of the document placing table 12. A plurality of sheets of the documents D set with the face up are sequentially taken out from the page of the lowest document sheet, that is, the last page, aligned by the aligning roller pair 16 and then fed to a preset position on the document placing table 12 by the conveyor belt 18.

In the automatic document feeding device 7, a reversing roller 20, non-reversing sensor 21, flapper 22 and paper discharging roller 23 are disposed on the end portion lying on the opposite side of the aligning roller pair 16 with the conveyor belt 18 disposed therebetween. The document D whose image information is read by the scanner section 4 is fed out from the document placing table 12 by the conveyor belt 18 and discharged onto a document discharging section 24 on the automatic document feeding device 7 via the reversing roller 20, non-reversing roller 21 and flapper 22. If the rear surface of the document D is read, the document D fed by the conveyor belt 18 is reversed by the reversing roller 20 by switching the position of the flapper 22 and then fed to a preset position on the document placing table 12 by the conveyor belt 18.

The scanner section 4 disposed in the apparatus main body 10 includes an exposure lamp 25 used as a light source for illuminating the document D placed on the document placing table 12 and a first mirror 26 for reflecting the reflection light from the document D in a preset direction and the exposure lamp 25 and first mirror 26 are mounted on a first carriage 27 disposed below the document placing table 12. The first carriage 27 is disposed to be movable in parallel to the document placing table 12 and reciprocally moved below the document placing table 12 by a driving motor via a toothed belt (not shown).

Below the document placing table 12, a second carriage 28 which is movable in parallel to the document placing table 12 is disposed. On the second carriage 28, second and third mirrors 30, 31 for sequentially reflecting the reflection light from the document D reflected by the first mirror 26 are disposed at right angles. The second carriage 28 is driven to follow the first carriage 27 by the toothed belt for driving the first carriage 27 and moved in parallel to the document placing table 12 at half speed of the first carriage 27.

Below the document placing table 12, an image forming lens 32 for focusing the reflection light from the third mirror 31 on the second carriage 28 and a CCD line sensor 34 for photoelectrically converting the reflection light focused by the image forming lens 32 are disposed. The image forming lens 32 is disposed to be moved by a driving mechanism in a plane containing the light axis of the light reflected from the third mirror 31 and forms an image with desired magnification set by the movement thereof. Then, the line sensor 34 photoelectrically converts the incident reflection light and outputs an electrical signal corresponding to the read document D.

The printer section 6 includes a laser exposing device 40. The laser exposing device 40 includes a semiconductor laser oscillator 41 used as a light source, a polygon mirror 36 for continuously reflecting the laser light emitted from the semiconductor laser oscillator 41 to effect the laser scanning process, a polygon motor 37 used as a scanning motor for rotating the polygon mirror 36 at preset rotation speed which will be described later, and an optical system 42 for deflecting the laser light from the polygon mirror 36 to guide the laser light to a photosensitive drum 44 which will be described later and is fixedly supported on a supporting frame (not shown) of the apparatus main body 10.

The ON/OFF state of the semiconductor laser oscillator 41 is controlled according to image information obtained by reading the document D by the scanner section 4 or facsimile transmission/reception document information. The laser light emitted from the semiconductor laser oscillator 41 is directed to the photosensitive drum 44 via the polygon mirror 36 and optical system 42 and exposes and scans the outer surface of the photosensitive drum 44 to form an electrostatic latent image on the outer surface of the photosensitive drum 44.

The printer section 6 has the rotatable photosensitive drum 44 used as an image carrier and disposed at substantially the center of the apparatus main body 10 and the outer surface of the photosensitive drum 44 is exposed and scanned by the laser light from the laser exposing device 40 so that a desired electrostatic latent image can be formed on the outer surface of the photosensitive drum 44. Around the photosensitive drum 44, an electrifying charger 45 for electrifying preset charges on the outer surface of the photosensitive drum 44, a developing unit 46 used as developing means for supplying toner used as a developer to the electrostatic latent image formed on the photosensitive drum 44 to develop the image with desired image density, a separation charger 47 for separating a sheet of paper P used as an image forming medium supplied from a paper feeding cassette which will be described later from the photosensitive drum 44, a transfer charger 48 for transferring the toner image formed on the photosensitive drum 44 onto the paper P, a separation claw 49 for separating the paper P from the outer surface of the photosensitive drum 44, a cleaning device 50 for cleaning toner remaining on the outer surface of the photosensitive drum 44, and a discharging unit 51 for discharging the outer surface of the photosensitive drum 44 are sequentially arranged.

In the lower internal portion of the apparatus main body 10, an upper stage paper feeding cassette 52, middle stage paper feeding cassette 53 and lower stage paper feeding cassette 54 which can be withdrawn from the apparatus main body 10 are arranged in the stacked form and sheets of paper with different sizes are loaded in the respective paper feeding cassettes 52, 53, 54. A large-capacity feeder 55 is disposed beside the paper feeding cassettes 52 to 54 and, for example, 3000 sheets of A4-size paper P which is frequently used are received in the large-capacity feeder 55. Further, above the large-capacity feeder 55, a paper feeding cassette 57 which is also used as a manual paper-feeding tray 56 is removably mounted.

In the apparatus main body 10, a feeding path 58 extending from the respective paper feeding cassettes 52 to 54 and large-capacity paper feeder 55 through the transferring section positioned between the photosensitive drum 44 and the transfer charger 48 is formed and a fixing device 60 having a fixing lamp 60a is disposed at the end of the feeding path 58. An outlet port 61 is formed in the side wall of the apparatus main body 10 which faces the fixing device 60 and a finisher 150 of single tray is attached to the outlet port 61.

In the neighboring portions of the upper stage paper feeding cassette 52, middle stage paper feeding cassette 53, lower stage paper feeding cassette 54 and paper feeding cassette 57 and in the neighboring portion of the large-capacity feeder 55, pickup rollers 63 for taking out the paper P for each sheet from the paper feeding cassettes 52, 53, 54, 57 and the large-capacity paper feeding cassette 55 are respectively disposed. Further, a large number of paper feeding rollers 64 for feeding the paper P taken out by the pickup roller 63 via the feeding path 58 are disposed along the feeding path 58.

A resist roller pair 65 is disposed on the upstream side of the photosensitive drum 44 in the feeding path 58. The resist roller pair 65 is used for correcting the inclination of the taken-out paper p, aligning the front end of the paper P with the toner image on the photosensitive drum 44 and supplying the paper P to the transferring section at the same speed as the moving speed of the outer surface of the photosensitive drum 44. In front of the resist roller pair 65, that is, on the paper feeding roller 64 side, a prior-to-aligning sensor 66 for detecting arrival of the paper P is disposed.

The paper P taken out for each sheet by the pickup roller 63 from the paper feeding cassette, 52, 53, 54, 57 or the large-capacity paper feeding cassette 55 is fed to the resist roller pair 65 by the paper feeding roller pair 64. Then, the paper P is fed to the transferring section after the front end thereof is aligned by the resist roller pair 65.

In the transferring section, a developer image or toner image formed on the photosensitive drum 44 is transferred onto the paper P by the transferring charger 48. The paper P having the toner image transferred thereon is separated from the outer surface of the photosensitive drum 44 by the action of the separation charger 48 and separation claw 49 and fed to the fixing device 60 via the conveyor belt 67 which constitutes part of the feeding path 52. After the developer image is melted and fixed on the paper P by the fixing device 60, the paper P is discharged to the finisher 150 via the outlet port 61 by the paper feeding roller pair 68 and paper discharging roller pair 69.

An automatic double face setting device 70 for reversing the paper P which passes through the fixing device 60 and feeding the same to the resist roller pair 65 again is disposed below the feeding path 58. The automatic double face setting device 70 includes a temporary storage section 71 for temporarily storing the paper P, a reversing path 72 which is branched from the feeding path 58, for reversing the paper P which has passed through the fixing device 60 and guiding the same to the temporary storage section 71, a pickup roller 73 for taking out sheets of paper P stored in the temporary storing section 71 for each sheet and a paper feeding roller 75 for feeding the taken-out paper P to the resist roller pair 65 via a feeding path 74. In the branching portion of the feeding path 58 and reversing path 72, a distributing gate 76 for selectively distributing the paper P to the outlet port 61 or reversing path 72 is disposed.

In the case of double face copying, the paper P which has passed through the fixing device 60 is guided to the reversing path 72 by the distributing gate 76, temporarily stored in the temporary storage section 71 with the reversed side or the rear surface up, and then fed to the resist roller pair 65 via the feeding path 74 by the pickup roller 73 and paper feeding roller pair 75. After this, the paper P is aligned by the resist roller pair 65 and fed to the transferring section again and then a toner image is transferred to the reversed side or rear surface of the paper P. Then, the paper P is discharged to the finisher 150 via the feeding path 58, fixing device 60 and paper discharging roller 69.

The finisher 150 staples and stores the discharged document of one copy for each copy. Each time one sheet of paper P to be stapled is discharged from the outlet port 61, it is put towards the stapled side and aligned by a guide bar 151. When all of the sheets of paper have been discharged, the sheets of paper P of one copy discharged are suppressed by a paper holding arm 152 and stapled by a stapler unit (not shown).

After this, the guide bar 151 is lowered and the stapled sheets of paper P are discharged for each copy to a finisher discharging tray 154 by a finisher discharging roller 155. The lowering distance of the finisher discharging tray 154 is roughly determined by the number of sheets of paper P discharged and it is lowered stepwise each time the paper is discharged for each copy. Further, the guide bar 151 for aligning the discharged paper P is set in a high position so as not to abut against the paper P which is already stapled and placed on the finisher discharging tray 154. The finisher discharging tray 154 is connected to a shift mechanism (not shown) for selectively shifting the paper P of each copy in one of four directions, front, rear, right and left, for example, in the sort mode.

On the upper front portion of the apparatus main body 10, an operation panel 80 (not shown) for inputting a copy start instruction for starting the copying operation and various copying conditions and displaying the operation state is disposed.

Block Diagram of Digital Copying Machine

Figure 2:
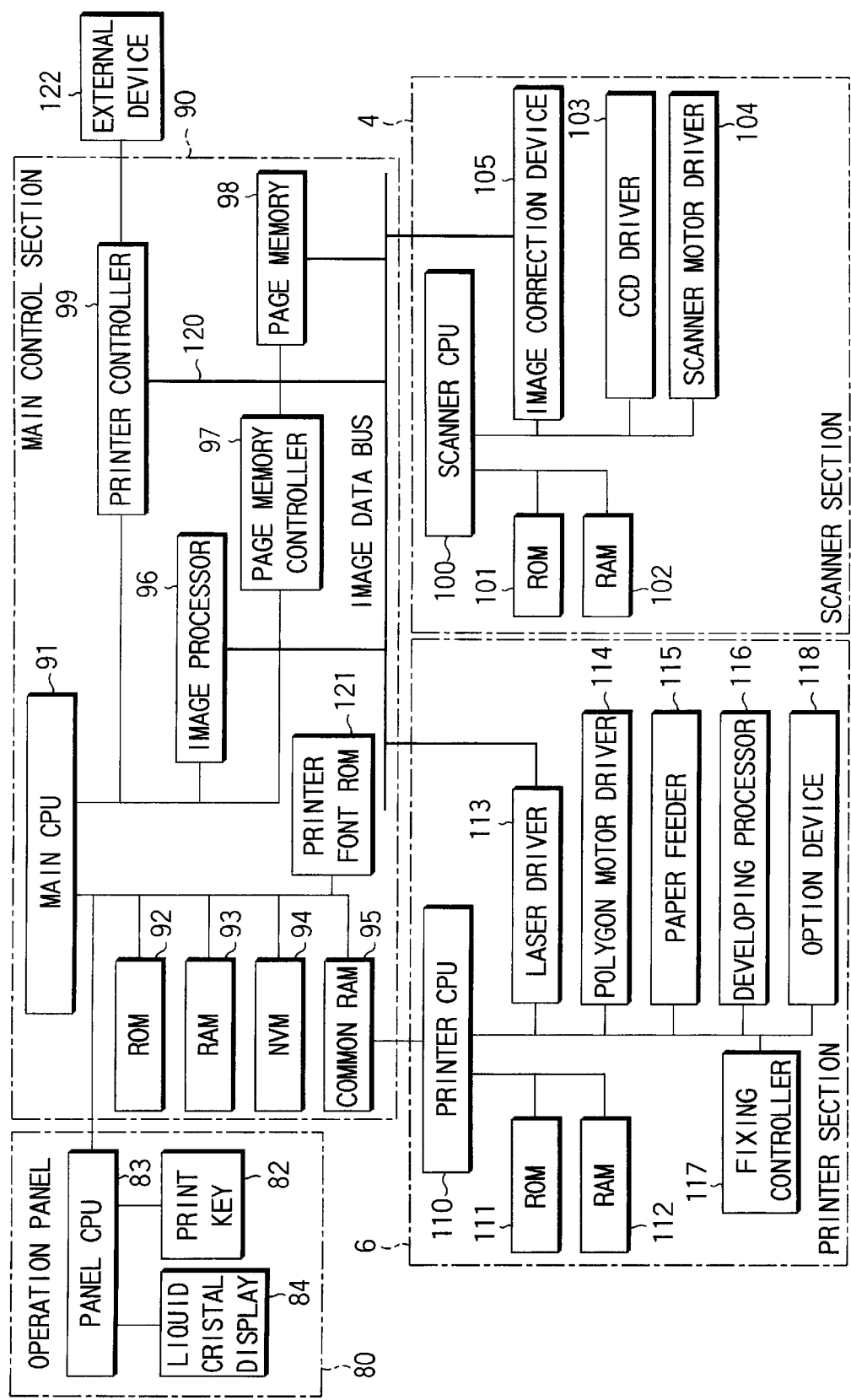
FIG. 2 is a block diagram showing the electrical construction of the digital copying machine according to the above embodiment.

FIG. 2 is a block diagram schematically showing flow of signals for controlling the digital copying machine shown in FIG. 1 and the electrical connection thereof. In FIG. 2, the control system includes three CPUs (Central Processing Units), that is, a main CPU 91 in a main control section 90, a scanner CPU 100 of the scanner section 4 and a printer CPU 110 of the printer section 6.

The main CPU 91 is used for effecting the bi-directional communication by use of the printer CPU 110 and common RAM 95, the main CPU 91 issues an operation instruction and the printer CPU 110 returns a state status. The printer CPU 110 and scanner CPU 100 perform the serial communication, the printer CPU 110 issues an operation instruction and the scanner CPU 100 returns a state status.

The operation panel 80 includes various operation keys 81, a liquid crystal display section 82 and a panel 83 to which the above units are connected and is connected to the main CPU 91.

The main control section 90 includes the main CPU 91, ROM 92, RAM 93, NVRAM 94, common RAM 95, image processing section 96, page memory control section 97, page memory 98, printer controller 99 and printer font ROM 121.

The main CPU 91 controls the whole portion of the digital copying machine. In the ROM 92, a control program and the like are stored. The RAM 93 temporarily stores data. The NVRAM (Nonvolatile RAM; Nonvolatile Random Access Memory) 94 keeps stored data even if the power supply thereof is cut off. The common RAM 95 is used for effecting the bi-directional communication between the main CPU 91 and the printer CPU 110. The page memory control section 97 stores or reads out image information into or from the page memory 98. The page memory 98 has an area capable of storing image information of a plurality of pages and is formed to store data obtained by compressing image information from the scanner section 4 for each page.

In the printer font ROM 121, font data corresponding to print data is stored. The printer controller 99 develops print data from an external device 122 such as a personal computer into image data by use of font data stored in the printer font ROM 121 with the resolution corresponding to data indicating the resolution attached to the print data.

The scanner section 4 includes the scanner CPU 100 for controlling the whole portion of the scanner section, a ROM 101 in which a control program and the like are stored, a RAM 102 for storing data, a CCD driver 103 for driving the line sensor 34, a scanning motor driver 104 for controlling the rotation of a scanning motor for moving the exposing lamp 25 and mirrors 26, 27, 28, and an image correcting section 105.

The image correcting section 105 includes an A/D converting circuit for converting an analog signal from the line sensor 34 into a digital signal, a shading correction circuit for correcting a variation in the threshold level for an output signal from the line sensor 34 which is caused by a variation in the characteristics of the line sensor 34, a variation in the ambient temperature or the like, and a line memory for temporarily storing a digital signal which is supplied from the shading correction circuit and subjected to the shading correction process.

The printer section 6 includes the printer CPU 110 for controlling the whole portion of the printer section, a ROM 111 in which a control program and the like are stored, a RAM 112 for storing data, a laser driver 113 for driving the semiconductor laser oscillator 41, a polygon motor driver 114 for driving the polygon motor 37 of the laser exposing device 40, a feeding control section 115 for controlling feeding of the paper P by the feeding path 58, a process control section 116 for controlling the process for charging, developing and transferring by use of the electric charger 45, developing unit 46 and transferring charger 48, a fixing controlling section 117 for controlling the fixing device 60 and an option control section 118 for controlling the option.

The image processing section 96, page memory 98, printer controller 99, image correcting section 105 and laser driver 113 are connected to an image data bus 120.

Image Processing Section which is Main Portion of this Invention

Next, the process of the image processing section which is a main portion of this invention is explained in detail with reference to the accompanying drawings.

Figure 3:
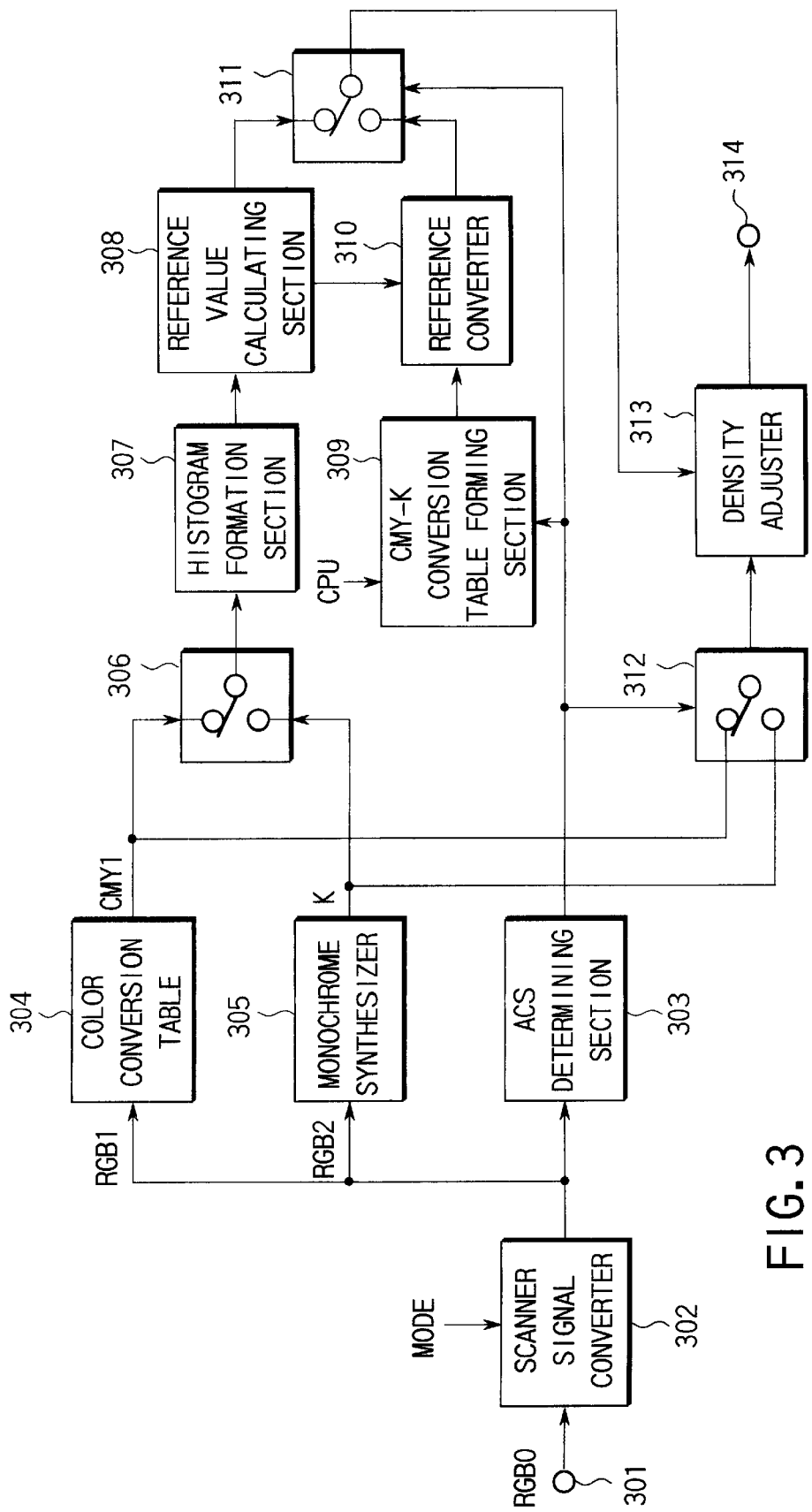
FIG. 3 is a block diagram showing the schematic construction of a main portion of the image processing apparatus according to the above embodiment.

The image processing section 96 of FIG. 2 effects various processes for image data obtained by reading the document by use of the scanner 4 and effects the density characteristic (gradation characteristic) correcting process, that is, automatic density adjusting process as the process relating to this invention. In FIG. 3, the construction of a portion of the image processing apparatus which is the image processing section 96 relating to the automatic density adjusting process is shown.

In the circuit of FIG. 3, image information obtained by reading the document by use of the scanner section 4 is input to an input terminal 301 as input image data RGB0 constructed by primary color component signals, that is, 8-bit digital data items for R, G, B (red, green, blue). The input image data RGB0 is converted according to the processing mode of the image processing apparatus by a scanner signal converting section 302.

That is, the image processing apparatus of this embodiment has a color processing mode and monochrome processing mode as the processing mode and the modes can be selectively set. The input/output characteristic of the scanner signal converting section 302 is switched according to a processing mode signal MODE, and in the case of the color processing mode, the input/output characteristic is set to a characteristic indicating a quadratic curve as shown in FIG. 4A and the input image data RGB0 is converted to image data RGB1, and in the case of the monochrome processing mode, the input/output characteristic is set to a linear characteristic (no conversion) as shown in FIG. 4B and image data RGB2 is output. The image data RGB1 or RGB2 output from the scanner signal converting section 302 is input to an ACS determining circuit 303, color conversion table 304 and monochrome synthesizing section 305.

The ACS determining circuit 303 is a circuit for determining whether the document is a color document or monochrome document based on the image data RGB1 or RGB2 at the time of pre-scanning, and more specifically, for example, the determination of color/monochrome is made for the input image data RGB1 or RGB2 for each pixel, the result of determination is counted and it finally outputs the result of determination (ACS determination result) indicating the color document or monochrome document based on the ratios of the count of the color determination results and the count of the monochrome determination results to the whole number of pixels in the document size area.

The color conversion table 304 converts the image data RGB1 supplied from the scanner signal converting section 302 to color recording image data CMY1 constructed by recording color component signals of C (cyan), M (magenta), Y (yellow) in the color processing mode. The monochrome synthesizing section 305 synthesizes monochrome image data K based on the image data RGB2 input from the scanner signal converting section 302 in the monochrome processing mode.

The color recording image data CMY1 from the color conversion table 304 is input to one input terminal of each of switches 306 and 312 and the monochrome image data K from the monochrome synthesizing section 305 is input to the other input terminal of each of the switches 306 and 312.

The switch 306 outputs the color recording image data CMY1 to a histogram forming section 307 when the ACS function is used, that is, in a normal state in which the output mode is switched based on the result of ACS determination. Further, the switch 306 outputs one of the color recording image data CMY1 and monochrome image data K to the histogram forming section 307 according to the output mode when the output mode is manually switched without using the ACS function.

The histogram forming section 307 forms three histograms shown in FIGS. 5A, 5B, 5C, that is, density histograms (which are referred to as CMY histograms) respectively indicating the frequencies of occurrence of density levels of C, M, Y based on the color recording image data CMY1 when the ACS function is used. On the other hand, if the ACS function is not used, it forms a CMY histogram based on the color recording image data CMY1 according to the output mode in the same manner as described above or forms three histograms shown in FIGS. 6A, 6B, 6C, that is, density histograms (which are referred to as K histograms) each indicating the frequency of occurrence of density levels of K based on the monochrome recording image data K. The three histograms shown in FIGS. 6A, 6B, 6C are the same in practice and the three K histograms are formed in correspondence to the CMY histograms.

Data of the CMY histograms or K histograms formed by the histogram forming section 307 is input to a reference value calculating section 308. In the reference value calculating section 308, a first reference value for density adjustment corresponding to the color document is calculated based on the CMY histograms when the ACS function is used. If the ACS function is not used, the first reference value for density adjustment corresponding to the color document is calculated based on the CMY histograms according to the output mode or a reference value for density adjustment corresponding to the monochrome document is calculated based on the K histogram. The reference value calculated in the reference value calculating section 308 is input to a reference value converting section 310 and one input terminal of a switch 311. The method for calculating the reference value in the reference value calculating section 308 will be later explained in detail.

At the time of pre-scanning, a CMY-K conversion table is formed in a CMY-K conversion table forming section 309 in parallel with formation of the histograms in the histogram forming section 307 as described above.

That is, the CMY-K conversion table forming section 309 forms a conversion table (which is called a CMY-K conversion table) for setting the color recording image data CMY1 and monochrome image data K to correspond to each other when the result of determination of the ACS determining section 303 indicates the monochrome document. The detail construction of the CMY-K conversion table forming section 309 will be later explained in detail.

In the reference value converting section 310, the first reference value corresponding to the color document and calculated in the reference value calculating section 308 is converted into a second reference value for density adjustment corresponding to the monochrome document by use of the conversion table formed by the CMY-K conversion table forming section 309. The reference value converted in the reference value converting section 310 is supplied to the other input terminal of the switch 311.

The switch 311 supplies the first reference value corresponding to the color document and calculated in the reference value calculating section 308 to a density adjusting section 313 if the result of determination in the ACS determining section 303 indicates the color document and supplies the second reference value corresponding to the monochrome document and converted in the reference value converting section 310 to the density adjusting section 313 if the result of determination in the ACS determining section 303 indicates the monochrome document.

A switch 312 provided on the input side of the density adjusting section 313 selects the color recording image data CMY1 from the color conversion table 304 if the result of determination in the ACS determining section 303 indicates the color document, selects the monochrome image data K from the monochrome synthesizing section 305 if the result of determination in the ACS determining section 303 indicates the monochrome document and supplies the selected data to the density adjusting section 313. The density adjusting section 313 subjects the color recording image data CMY1 or monochrome image data K supplied from the switch 312 to the density adjustment by use of the reference value supplied from the switch 311. The density adjustment is effected at the main scanning time.

(CMY-K Conversion Table Forming Section)

Next, the CMY-K conversion table forming section 309 is explained in detail with reference to FIG. 7. The CMY-K conversion table forming section 309 forms a CMY-K conversion table used for setting the color recording image data CMY1 and monochrome image data K to correspond to each other when it is determined in the ACS determining section 303 that the document is a monochrome document.

As shown in FIG. 3, the color recording image data CMY1 constructed by CMY recording color component signals can be obtained by converting the input image data RGB0 constructed by RGB primary color component signals into image data RGB1 by use of the scanner signal converting section 302 and then converting the image data into CMY1 by use of the color conversion table 304. On the other hand, the monochrome image data K can be obtained by converting the input image data RGB0 into RGB2 by use of the scanner signal converting section 302 and then converting RGB2 into K by use of the monochrome synthesizing section 305.

Figure 7:
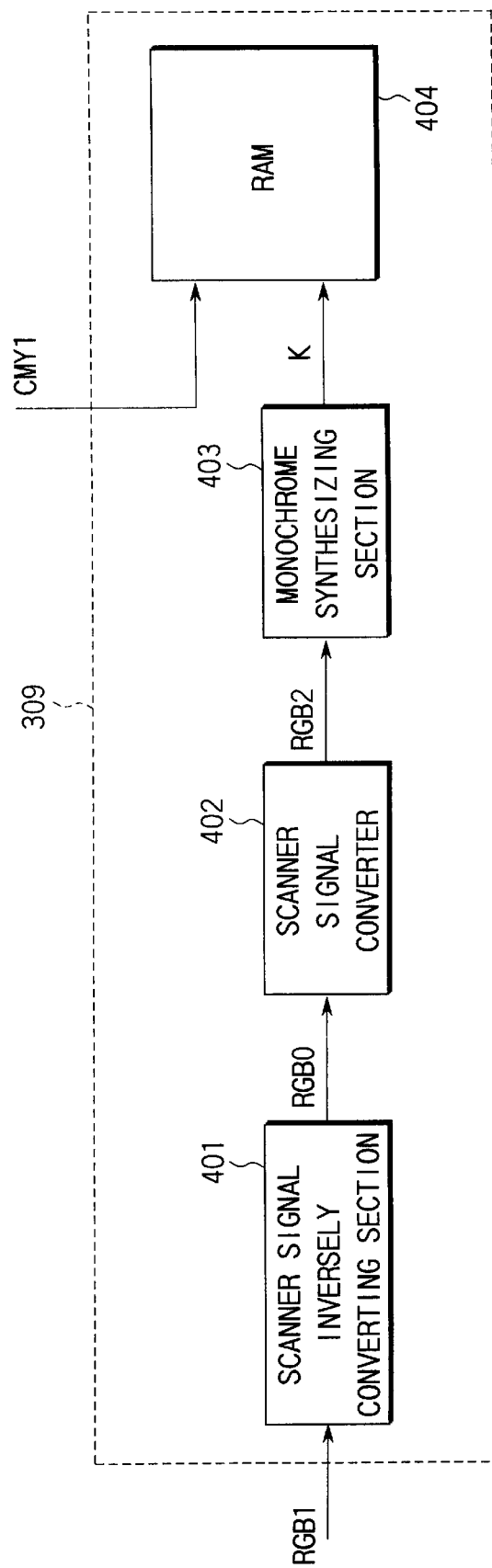
FIG. 7 is a block diagram showing the construction of a CMY-K conversion table forming section in the image processing apparatus according to the above embodiment.

With attention paid to the above point, K corresponding to CMY1 is derived by making calculations in the order of CMY1→RGB1→RGB0→RGB2→K in the CMY-K conversion table forming section 309 of FIG. 7 and a CMY-K conversion table in which the relation between them is described is formed.

The CMY-K conversion table forming procedure is explained more in detail. The color recording image data CMY1 is obtained by converting the image data RGB1 by use of the color conversion table 304 and since the color conversion table 304 is previously given, it is possible to easily set the correspondence relation between CMY1 and RGB1.

The processing mode is set in the color processing mode at the pre-scanning time, but since formation of the CMY-K conversion table is a process effected only when it is determined in the ACS determining section 303 that the document is a monochrome document, no problem occurs even if object data is considered to be the monochrome image data K. Basically, since C=M=Y and R=G=B in the monochrome image data K, the relation between RGB1 and CMY1 is formed only by considering a case wherein each color has the same amount (same density).

The color conversion table 304 receives a set of RGB of the image data RGB1 and outputs a set of CMY corresponding to the input as the image CMY1. At the pre-scanning time, CMY for nine RGB equivalent points of the image data RGB1 is derived as the color recording image data CMY1 by use of the color conversion table 304 and input to the CMY-K conversion table 309.

Further, the image data RGB1 from the scanner signal converting section 302 of FIG. 3 having the characteristic shown in FIG. 4A in correspondence to the color processing mode at the pre-scanning time is also input to the CMY-K conversion table forming section 309. The image data RGB1 is converted into input image data RGB0 by use of a scanner signal inversely converting section 401 having an inverted characteristic with respect to the characteristic shown in FIG. 4A and then the image data RGB0 is converted into image data RGB2 by use of a scanner signal converting section 402 having the characteristic shown in FIG. 4B. The image data RGB2 output from the scanner signal converting section 402 is further converted into monochrome image data K by use of a monochrome synthesizing section 403. As a result, one K is derived for one set of CMY1.

In the same manner as described above, CMY1 and K are derived for a plurality of RGB equivalent points (image data RGB1) and, for example, a correlation function with CMY1 set on the abscissa and K set on the ordinate is derived. The correlation function can be derived by use of a method which is suitable for data used, for example, linear interpolation, least square or linear approximation for the respective points. The correlation function is formed in a RAM 404 as the CMY-K conversion table. That is, color recording image data CMY1 output from the color conversion table 304 of FIG. 3 and monochrome image data K output from the monochrome synthesizing section 403 are set in a corresponding relation and written into the RAM 404. More specifically, CMY1 is supplied to the RAM 404 as address data and K is written in an designated address location.

(Calculation Method of Reference Value)

Next, the method for calculating the reference value in the reference value calculating section 308 is explained.

Figure 8:
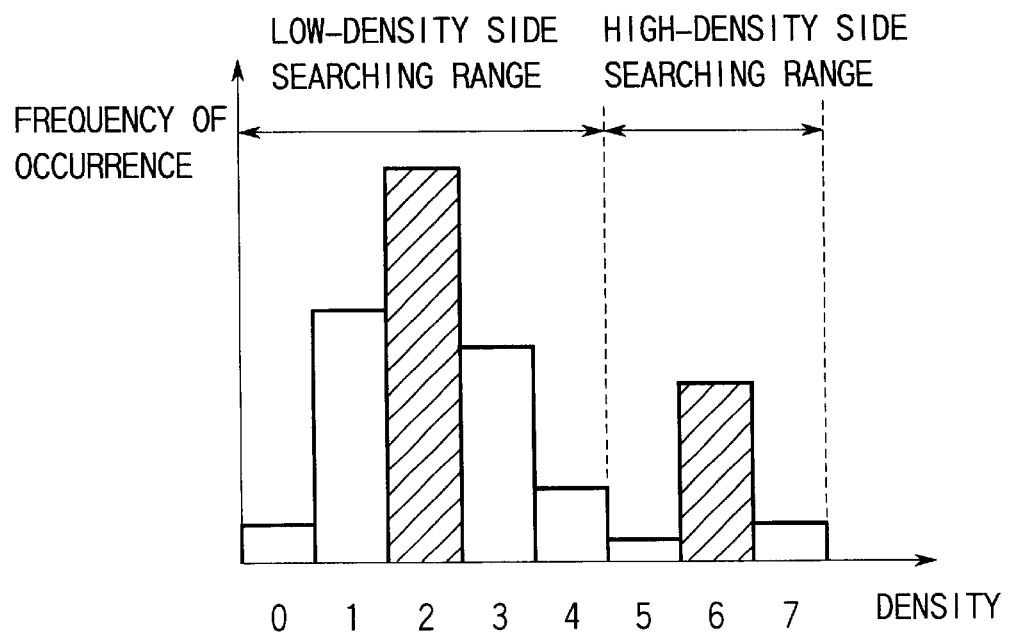
FIG. 8 is a diagram showing an example of a histogram and a peak position searching range on the histogram for explaining the reference value calculating method in a reference value calculating section in the image processing apparatus according to the above embodiment.

FIG. 8 shows one example of a histogram formed in the histogram forming section 307. A histogram has one, two, three or more peaks, but in the example shown in FIG. 8, one peak is provided in each of the low density side and high density side and two peaks in total are provided. In this case, peak searching ranges are provided in the low density side and high density side in order to determine the peak. In the example of FIG. 8, the density has eight levels of "0" to "7", the searching range of "0" to "4" is set for the low density side and the searching range of "5" to "7" is set for the high density side. In the case of this example, the peak position on the low density side is set in the position of the density level "2", and the peak position on the high density side is set in the position of the density level "6".

Figure 9:
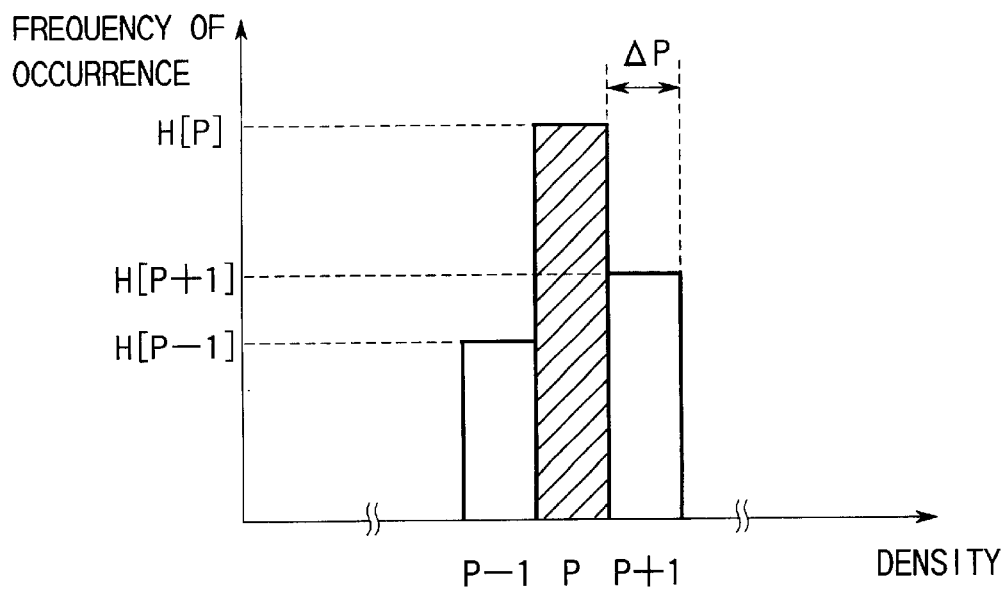
FIG. 9 is a diagram for explaining the reference value calculating principle in the reference value calculating section in the image processing apparatus according to the above embodiment.

In the reference value calculating section 308, the reference value is derived by use of the density level of the peak position of the histogram thus derived and the density levels on the right and left positions thereof. FIG. 9 shows the frequency of occurrence of the density level of a peak position of the histogram and the density levels of the right and left positions of the peak position. In this case, P indicates the density level of the peak position, (P−1) and (P−2) respectively indicate the density levels of the left and right positions of the peak position, H[P] indicates the frequency of occurrence of the density level P, and H[P−1] and H[P−2] respectively indicate the frequencies of occurrence of the density levels (P−1) and (P−2).

In this case, a reference value Pref is derived as follows.

$$Pref = P \times \Delta P + (H[P+1] - H[P-1])/H[P] \times \Delta P/2 \quad (1)$$

where $\Delta P$ indicates the density step width of the histogram.

In practice, the reference value Pref is derived for each of the low density range and high density range. The reference values thus derived for the low density range and high density range are set to Prefw and Prefb.

In the reference value converting section 310, the reference values Prefw, Prefb (first reference value) thus derived in the reference value calculating section 308 are converted by use of the CMY-K conversion table formed by the CMY-K conversion table forming section 309. That is, Prefw, Prefb are substituted for the CMY value in the CMY-K conversion table and corresponding values of K are output as a second reference value obtained by conversion.

(Density Adjustment)

The density adjusting section 313 subjects the color recording image data CMY1 or monochrome image data K to the density adjustment by use of a reference value supplied from the switch 312. Specifically, for example, the density adjustment is effected in a width ranging from 0 to FF (hex) according to the following equation.

$$D' = (D - Prefw)/(Prefb - Prefw) \times FF(\text{hex}) \quad (2)$$

where D indicates image data obtained before the density adjustment and D' indicates image data obtained after the density adjustment.

(Entire Flow of Density Adjusting Process of This Invention)

Figure 10:
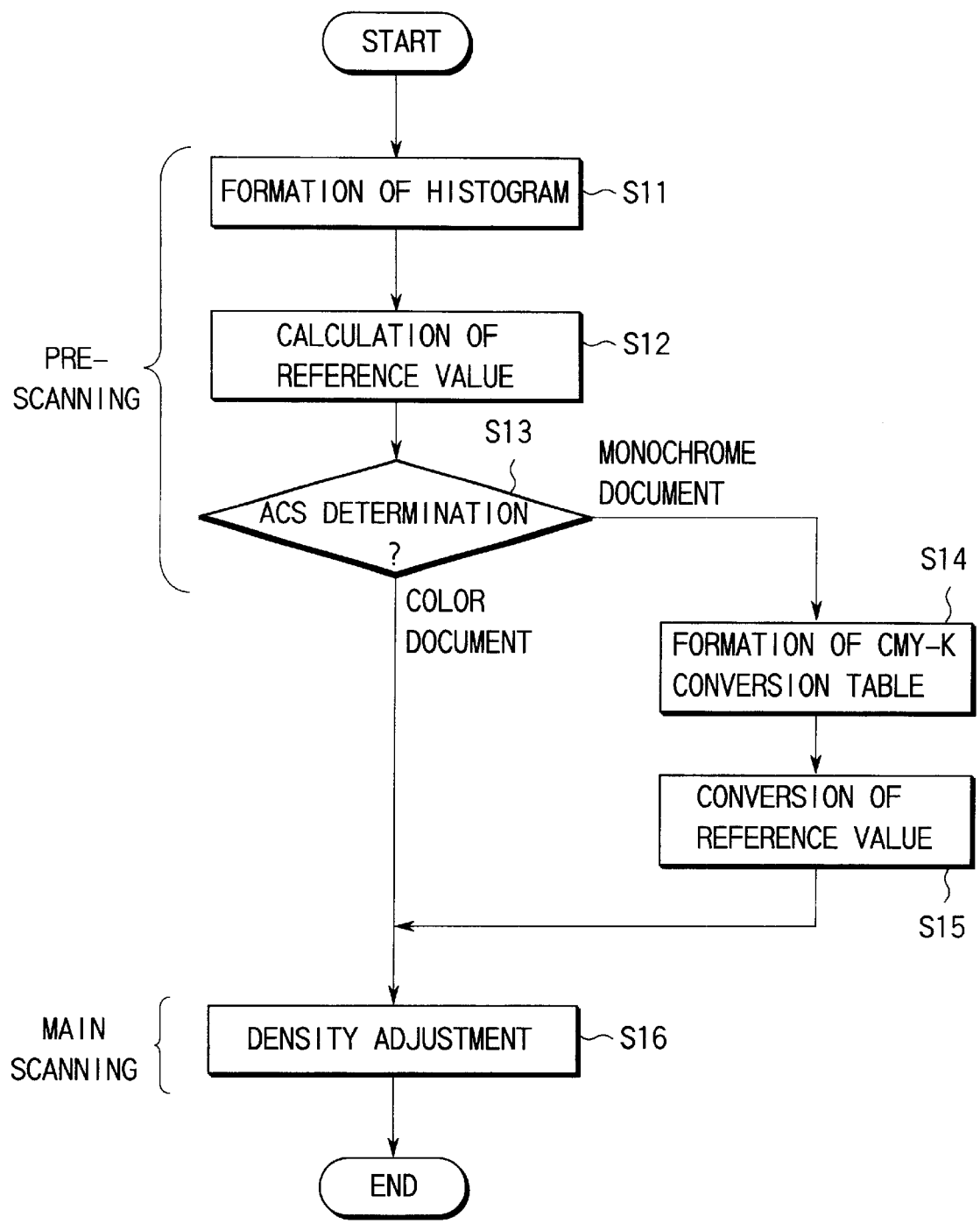
FIG. 10 is a flowchart for illustrating the processing procedure relating to the density adjustment in the image processing apparatus according to the above embodiment.

Next, the processing procedure relating to the density adjustment in the image processing apparatus of this embodiment is explained with reference to the flowchart shown in FIG. 10.

First, when the process is started, the pre-scanning process is effected. At the time of pre-scanning, the processing mode is set to the color processing mode and the input/output characteristic of the scanner signal converting section 302 is set to the characteristic shown in FIG. 4A. In the pre-scanning process, the process for forming a histogram (step S11), the process for deriving a reference value (step S12) and the process for ACS determination (step S13) are effected according to the procedure described before.

At this time, the switch 306 is connected to the color conversion table 304 and a CMY histogram is formed in the histogram forming section 307. A first reference value corresponding to the color document is formed in the reference value calculating section 308 based on the CMY histogram as described before.

In the ACS determination step S13, it is determined whether the document read by the scanner section 4 is a color document or monochrome document, that is, whether image data RGB0 input to the input terminal 301 is data obtained by reading a color document or data obtained by reading a monochrome document.

If the result of ACS determination indicates that the document is a color document, color recording image data CMY1 output from the color conversion table 304 is selected by the switch 312 and input to the density adjusting section 313. At the same time, the first reference value calculated by the reference value calculating section 308 is selected by the switch 311 and supplied to the density adjusting section 313. Thus, in the density adjusting section 313, the color recording image data CMY1 is subjected to the density adjustment by use of the first reference value (step S16).

On the other hand, if the result of ACS determination indicates that the document is a monochrome document, monochrome image data K synthesized by the monochrome synthesizing section 305 is selected by the switch 312 and input to the density adjusting section 313, and at the same time, a CMY-K conversion table is formed by the CMY-K conversion table forming section 309 by the procedure described before (step S14), and the first reference value is converted to a second reference value corresponding to a monochrome document by the reference value converting section 310 by use of the CMY-K conversion table (step S15). Then, the second reference value is selected by the switch 311 and supplied to the density adjusting section 313. Thus, in the density adjusting section 313, the monochrome image data K is subjected to the density adjustment by use of the second reference value (step S16).

As described above, according to this invention, a reference value can be obtained for the automatic density adjustment irrespective of the color image mode or monochrome image mode at the same time as the ACS determination process is effected by effecting the pre-scanning process only once. Therefore, even if the set processing mode does not correspond to the result of ACS determination, a reference value for the color image mode is automatically converted to a reference value for the monochrome image mode, and as a result, it is unnecessary to effect the pre-scanning process twice as in the conventional case and the processing time will not be increased. Therefore, for example, if the apparatus is applied to a digital copying machine, a period from the time the copying operation is started until the time an output image is obtained can be reduced and made constant.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data processing apparatus comprising;
   determining means for determining whether input image data supplied is a color image mode or monochrome image mode;

histogram forming means for forming a histogram indicating the frequency of occurrence of density levels for each of a plurality of color component signals, corresponding to the input image data;

reference value calculating means for calculating a first reference value for density adjustment for the color image mode, corresponding to the histogram formed by the histogram forming means;

reference value converting means for converting the first reference value for the color image mode into a second reference value for the monochrome image mode and outputting the second reference value; and density adjusting means for adjusting the density of the input image data by using the first reference value when the determining means determines that the input image data is the color image mode and using the second reference value output from the reference value converting means when the determining means determines that the input image data is the monochrome image mode and then outputting output image data.

2. An image data processing apparatus according to claim 1, wherein the reference value converting means includes reference value converting means for converting the first reference value which is a recording component signal for the color image mode into a second reference value which is a single color component signal for the monochrome image mode and outputting the second reference value.

3. An image data processing apparatus according to claim 1, wherein the reference value converting means includes conversion table forming means for forming a conversion table used for a reference value converting process for converting the first reference value for the color image mode into the second reference value for the monochrome image mode; and reference value converting means for converting the first reference value for the color image mode into the second reference value for the monochrome image mode, corresponding to the conversion table formed by the conversion table forming means and outputting the second reference value.

4. An image data processing apparatus according to claim 1, wherein the reference value converting means includes conversion table forming means for forming a conversion table used for converting the first reference value for the color image mode into the second reference value for the monochrome image mode and outputting the second reference value when the determining means determines that the input image data is the monochrome image mode; and reference value converting means for converting the first reference value for the color image mode into the second reference value for the monochrome image mode, corresponding to the conversion table formed by the conversion table forming means and outputting the second reference value.

5. An image data processing apparatus according to claim 1, wherein the reference value converting means includes calculating means for deriving image data (RGB1) from color recording image data (CMY1) constructed by CMY recording color component signals when the determining means determines that the input image data is the monochrome image mode, deriving input image data (RGB0) from the image data (RGB1) by use of a scanner signal inversely converting section, converting the input image data (RGB0) to image data (RGB2) by use of a scanner signal converting section, deriving monochrome image data (K) from the image data (RGB2) by use of a monochrome synthesizing section and thus deriving the monochrome image data (K) corresponding to the color recording image data (CMY1);

conversion table forming means for forming a CMY-K conversion table in which the relation between the monochrome image data (K) derived by the calculating means and the color recording image data (CMY1) is described; and reference value converting means for converting the first reference value for the color image mode into the second reference value for the monochrome image mode, corresponding to the conversion table formed by the conversion table forming means and outputting the second reference value.

6. An image data processing apparatus according to claim 1, wherein the density adjusting means includes density adjusting means for adjusting the density of color recording image data (CMY1) obtained by processing the input image data based on a color conversion table by use of the first reference value and outputting output image data when the determining means determines that the input image data is the color image mode, and adjusting the density of monochrome image data (K) obtained by processing the input image data in a monochrome synthesizing section by use of the second reference value and outputting output image data when the determining means determines that the input image data is the monochrome image mode.

7. An image data processing apparatus comprising;

determining means for determining whether input image data supplied is a first image mode or second image mode;

histogram forming means for forming a histogram indicating the frequency of occurrence of density levels for each of a plurality of color component signals, corresponding to the input image data;

reference value calculating means for calculating a first reference value for density adjustment for the first image mode corresponding to the histogram formed by the histogram forming means;

reference value converting means for converting the first reference value for the first image mode into a second reference value for the second image mode and outputting the second reference value; and density adjusting means for adjusting the density of the input image data by using the first reference value when the determining means determines that the input image data is the first image mode and using the second reference value output from the reference value converting means when the determining means determines that the input image data is the second image mode and then outputting output image data.

8. An image forming apparatus comprising;

determining means for determining whether input image data supplied is a first image mode or second image mode;

histogram forming means for forming a histogram indicating the frequency of occurrence of density levels for each of a plurality of color component signals corresponding to the input image data;

reference value calculating means for calculating a first reference value for density adjustment for the first image mode, corresponding to the histogram formed by the histogram forming means;

reference value converting means for converting the first reference value for the first image mode into a second reference value for the second image mode and outputting the second reference value;

density adjusting means for adjusting the density of the input image data by using the first reference value when the determining means determines that the input image data is the first image mode and using the second reference value output from the reference value converting means when the determining means determines that the input image data is the second image mode and then outputting output image data; and image forming means for forming an image on an image recording medium corresponding to the output image data output from the density adjusting means.

9. An image data processing method comprising;

determining step of determining whether input image data supplied is a color image mode or monochrome image mode;

histogram forming step of forming a histogram indicating the frequency of occurrence of density levels for each of a plurality of color component signals corresponding to the input image data;

reference value calculating step of calculating a first reference value for density adjustment for the color image mode corresponding to the histogram formed in the histogram forming step;

reference value converting step of converting the first reference value for the color image mode into a second reference value for the monochrome image mode and outputting the second reference value; and density adjusting step of adjusting the density of the input image data by using the first reference value when it is determined in the determining step that the input image data is the color image mode and using the second reference value output in the reference value converting step when it is determined in the determining step that the input image data is the monochrome image mode and then outputting output image data.

10. An image data processing method according to claim 9, wherein the reference value converting step includes a reference value converting step of converting the first reference value which is a recording component signal for the color image mode into a second reference value which is a single color component signal for the monochrome image mode and outputting the second reference value.

11. An image data processing method according to claim 9, wherein the reference value converting step includes a conversion table forming step of forming a conversion table used for a reference value converting process for converting the first reference value for the color image mode into the second reference value for the monochrome image mode; and reference value converting step of converting the first reference value for the color image mode into the second reference value for the monochrome image mode, corresponding to the conversion table formed in the conversion table forming step and outputting the second reference value.

12. An image data processing method according to claim 9, wherein the reference value converting step includes conversion table forming step of forming a conversion table used for converting the first reference value for the color image mode into the second reference value for the monochrome image mode and outputting the second reference value when it is determined in the determining step that the input image data is the monochrome image mode; and reference value converting step of converting the first reference value for the color image mode into the second reference value for the monochrome image mode, corresponding to the conversion table formed in the conversion table forming step and outputting the second reference value.

13. An image data processing method according to claim 9, wherein the reference value converting step includes calculating step of deriving image data (RGB1) from color recording image data (CMY1) constructed by CMY recording color component signals when it is determined in the determining step that the input image data is the monochrome image mode, deriving input image data (RGB0) from the image data (RGB1) by use of a scanner signal inversely converting section, converting the input image data (RGB0) to image data (RGB2) by use of a scanner signal converting section, deriving monochrome image data (K) from the image data (RGB2) by use of a monochrome synthesizing section and thus deriving the monochrome image data (K) corresponding to the color recording image data (CMY1);

conversion table forming step of forming a CMY-K conversion table in which the relation between the monochrome image data (K) derived in the calculating step and the color recording image data (CMY1) is described; and reference value converting step of converting the first reference value for the color image mode into the second reference value for the monochrome image mode, corresponding to the conversion table formed in the conversion table forming step and outputting the second reference value.

14. An image data processing method according to claim 9, wherein the density adjusting step includes density adjusting step of adjusting the density of color recording image data (CMY1) obtained by processing the input image data based on a color conversion table by use of the first reference value and outputting output image data when it is determined in the determining step that the input image data is the color image mode, and adjusting the density of monochrome image data (K) obtained by processing the input image data in a monochrome synthesizing section by use of the second reference value and outputting output image data when it is determined in the determining step that the input image data is the monochrome image mode.

15. An image data processing method comprising;

determining step of determining whether input image data supplied is a first image mode or second image mode;

histogram forming step of forming a histogram indicating the frequency of occurrence of density levels for each of a plurality of color component signals corresponding to the input image data;

reference value calculating step of calculating a first reference value for density adjustment for the first image mode corresponding to the histogram formed in the histogram forming step;

reference value converting step of converting the first reference value for the first image mode into a second reference value for the second image mode and outputting the second reference value; and density adjusting step of adjusting the density of the input image data by using the first reference value when it is determined in the determining step that the input image data is the first image mode and using the second reference value output in the reference value converting step when it is determined in the determining step that the input image data is the second image mode and then outputting output image data.

16. An image forming method comprising;

determining step of determining whether input image data supplied is a first image mode or second image mode;

histogram forming step of forming a histogram indicating the frequency of occurrence of density levels for each of a plurality of color component signals corresponding to the input image data;

reference value calculating step of calculating a first reference value for density adjustment for the first image mode corresponding to the histogram formed in the histogram forming step;

reference value converting step of converting the first reference value for the first image mode into a second reference value for the second image mode and outputting the second reference value;

density adjusting step of adjusting the density of the input image data by using the first reference value when it is determined in the determining step that the input image data is the first image mode and using the second reference value output in the reference value converting step when it is determined in the determining step that the input image data is the second image mode and then outputting output image data; and image forming step of forming an image on an image recording medium corresponding to the output image data output in the density adjusting step.

* * * * *